United States Patent
Horiuchi et al.

(10) Patent No.: US 10,703,046 B2
(45) Date of Patent: Jul. 7, 2020

(54) SHAPING SYSTEM, SHAPED OBJECT FORMATION METHOD, AND COMPUTER-READABLE STORAGE MEDIUM

(71) Applicant: CASIO COMPUTER CO., LTD., Shibuya-ku, Tokyo (JP)

(72) Inventors: Yuji Horiuchi, Higashiyamoto (JP); Yoshimune Motoyanagi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 69 days.

(21) Appl. No.: 15/719,105

(22) Filed: Sep. 28, 2017

(65) Prior Publication Data

US 2018/0162054 A1    Jun. 14, 2018

(30) Foreign Application Priority Data

Dec. 12, 2016 (JP) .................. 2016-239985
Jul. 24, 2017 (JP) .................. 2017-142423

(51) Int. Cl.
| | | |
|---|---|---|
| *B29C 64/393* | (2017.01) | |
| *B29C 64/112* | (2017.01) | |
| *B29C 64/291* | (2017.01) | |
| *B33Y 10/00* | (2015.01) | |
| *B33Y 50/02* | (2015.01) | |

(Continued)

(52) U.S. Cl.
CPC .......... *B29C 64/393* (2017.08); *B29C 61/04* (2013.01); *B29C 64/112* (2017.08); *B29C 64/291* (2017.08); *B33Y 10/00* (2014.12); *B33Y 30/00* (2014.12); *B33Y 50/02* (2014.12); *B41M 3/06* (2013.01); *B41M 3/16* (2013.01); *B29K 2105/04* (2013.01); *B29K 2105/256* (2013.01)

(58) Field of Classification Search
CPC ..... B29C 64/393; B29C 61/04; B29C 64/291; B29C 64/112; B33Y 10/00; B41M 3/06; B29K 2105/04; B29K 2105/256
See application file for complete search history.

(56) References Cited

U.S. PATENT DOCUMENTS

| | | | |
|---|---|---|---|
| 5,639,540 | A | 6/1997 | Imaeda |
| 8,870,327 | B2 | 10/2014 | Kanamura et al. |

(Continued)

FOREIGN PATENT DOCUMENTS

| | | |
|---|---|---|
| CN | 102649365 A | 8/2012 |
| JP | 64028660 A | 1/1989 |

(Continued)

OTHER PUBLICATIONS

Japanese Office Action dated Oct. 1, 2019 (and English translation thereof) issued in Japanese Patent Application No. 2017-142423.

*Primary Examiner* — Michael M. Robinson
(74) *Attorney, Agent, or Firm* — Holtz, Holtz & Volek PC (57) ABSTRACT

A shaping system includes: a printing device that prints an image using predetermined ink on a thermal expansion sheet having a thermal expansion layer on one side; and a heating device that performs: an identifier detection process of detecting an identifier provided on the thermal expansion sheet; a heating condition setting process of setting a heating condition for heating the thermal expansion sheet, based on the identifier; and a heating process of heating the thermal expansion sheet based on the set heating condition.

21 Claims, 8 Drawing Sheets

(51) Int. Cl.
*B29C 61/04* (2006.01)
*B33Y 30/00* (2015.01)
*B41M 3/16* (2006.01)
*B41M 3/06* (2006.01)
*B29K 105/00* (2006.01)
*B29K 105/04* (2006.01)

(56) References Cited

U.S. PATENT DOCUMENTS

| | | |
|---|---|---|
| 9,162,486 B2 | 10/2015 | Motoyanagi |
| 9,688,081 B1 | 6/2017 | Zengo et al. |
| 2003/0226642 A1* | 12/2003 | Okayasu .................... B41J 2/32 |
| | | 156/359 |
| 2012/0218338 A1 | 8/2012 | Kanamura et al. |
| 2013/0229478 A1* | 9/2013 | Horiuchi ................ B41M 7/009 |
| | | 347/188 |
| 2015/0070452 A1* | 3/2015 | Motoyanagi ............... B41J 3/60 |
| | | 347/102 |
| 2018/0162054 A1 | 6/2018 | Horiuchi et al. |

FOREIGN PATENT DOCUMENTS

| | | |
|---|---|---|
| JP | H03035542 U | 4/1991 |
| JP | H0825785 A | 1/1996 |
| JP | 2001130194 A | 5/2001 |
| JP | 2001150812 A | 6/2001 |
| JP | 2001341385 A | 12/2001 |
| JP | 2003072217 A | 3/2003 |
| JP | 2003178276 A | 6/2003 |
| JP | 2006167959 A | 6/2006 |
| JP | 2015071286 A | 4/2015 |
| JP | 2016010956 A | 1/2016 |
| JP | 6004125 B1 | 9/2016 |

\* cited by examiner

SHAPING SYSTEM, SHAPED OBJECT FORMATION METHOD, AND COMPUTER-READABLE STORAGE MEDIUM

BACKGROUND OF THE INVENTION

1. Field of the Invention

The present invention relates to a shaping system, a shaped object formation method, and a computer-readable storage medium.

2. Description of the Related Art

A stereoscopic image formation technique using an expansion sheet is known as one of the shaping techniques. For example, this technique is used in the production of teaching materials for the visually impaired such as braille. Japanese Patent Application Laid-Open No. 2001-150812 (Patent Document 1) discloses such technique as an example.

A thermal expansion sheet described in Patent Document 1 has a structure in which base paper (base material) is coated with a thermal expansion layer (foaming layer, foaming ink). The thermal expansion sheet thus has the front and back sides, and the front side or the back side is heated. In other words, which of the front and back sides of the thermal expansion sheet is to be a heating surface needs to be set. Moreover, the thermal expansion layer has a characteristic that its thickness differs depending on temperature or humidity during manufacture.

When heating the thermal expansion sheet to form a stereoscopic image, the front or back side of the thermal expansion sheet is heated by a heating process. Here, the thermal expansion layer tends to differ in thickness (have dispersion in thickness) depending on temperature, humidity, or the like during manufacture. Therefore, under the same heating condition, the thermal expansion layer may be unable to expand favorably depending on its thickness. For example, the expansion can be excessive or insufficient.

SUMMARY OF THE INVENTION

A shaping system includes: a printing device that prints an image using predetermined ink on a thermal expansion sheet having a thermal expansion layer on one side; and a heating device that performs: an identifier detection process of detecting an identifier provided on the thermal expansion sheet; a heating condition setting process of setting a heating condition for heating the thermal expansion sheet, based on the identifier; and a heating process of heating the thermal expansion sheet based on the set heating condition.

A computer-readable storage medium stores a program executable by a computer for controlling a shaping system, the program causing the computer to perform: printing an image using predetermined ink on a thermal expansion sheet having a thermal expansion layer on one side; detecting an identifier provided on the thermal expansion sheet; setting a heating condition for heating the thermal expansion sheet, based on the detected identifier; and heating the thermal expansion sheet based on the set heating condition.

A shaped object formation method includes: a printing step of printing an image using predetermined ink on a thermal expansion sheet having a thermal expansion layer on one side; a detection step of detecting an identifier provided on the thermal expansion sheet; a setting step of setting a heating condition for heating the thermal expansion sheet, based on the detected identifier; and a heating step of heating the thermal expansion sheet based on the set heating condition.

DETAILED DESCRIPTION OF THE INVENTION

An embodiment (hereafter referred to as "the present embodiment") of the present invention is described in detail below, with reference to drawings. The drawings merely provide schematic depiction to facilitate the full understanding of the present embodiment. In the drawings, the same or corresponding components are given the same reference signs, and their repeated description is omitted.

In the present embodiment, "stereoscopic image" means a shaped object. The shaped object includes a wide range of shapes in general, such as simple shapes, geometric shapes, and characters. The shaped object also includes decorations formed as a result of decorating. A decoration evokes a sense of beauty through vision and/or touch. The term "stereoscopic image formation" means not only forming a shaped object but also decorating (forming a decoration).

First Embodiment

Figure 1:
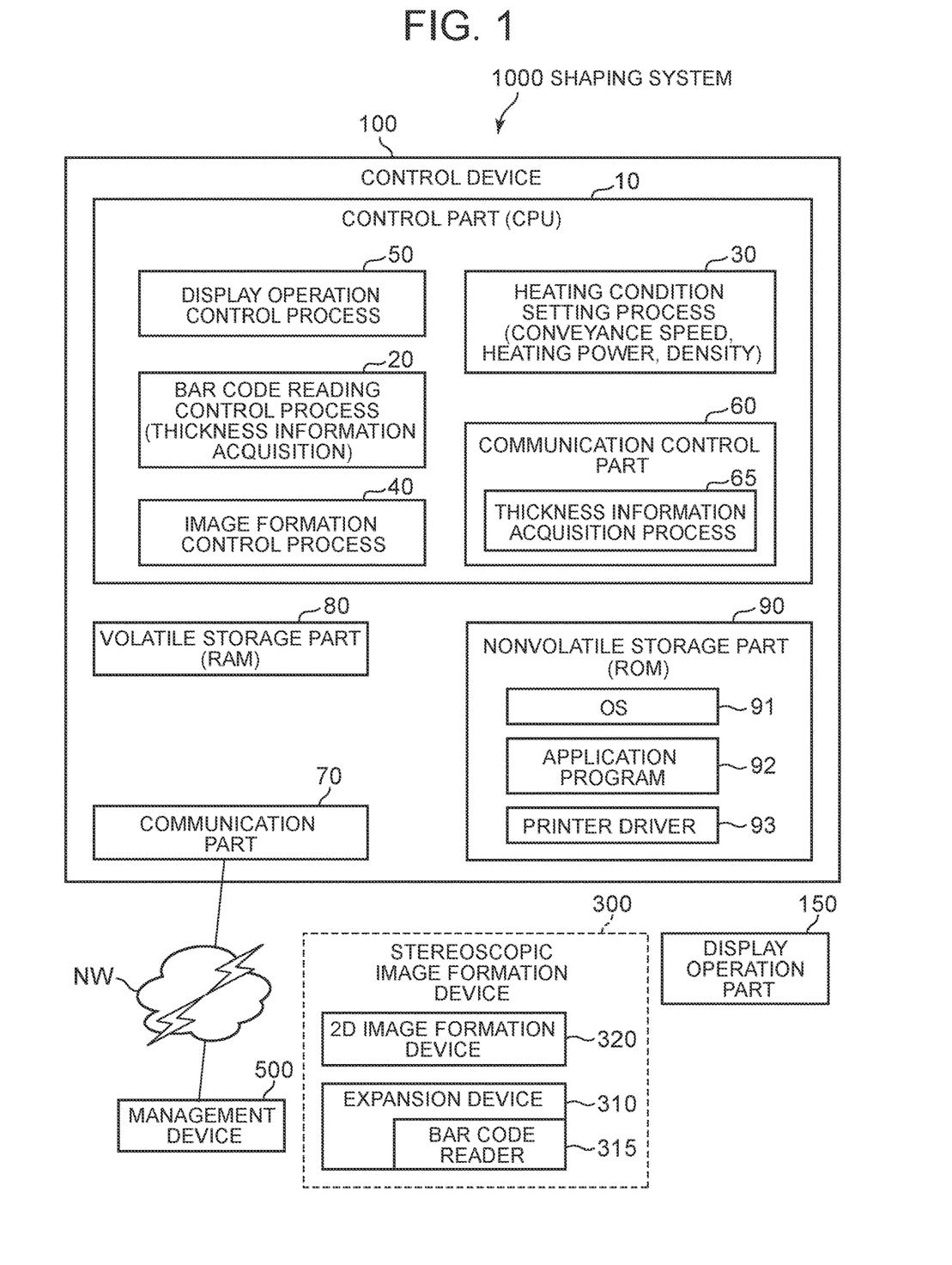
FIG. 1 is a block diagram of a shaping system according to a first embodiment of the present invention.

FIG. 1 is a block diagram of a shaping system according to a first embodiment of the present invention.

The present embodiment relates to a method of forming a stereoscopic image by printing, on a medium (e.g. thermal expansion sheet (thermal foaming sheet/distensible sheet)) having an expansion layer (foaming layer) that expands (distends) according to the amount of absorbed heat on one side, a desired image with black ink including a material (e.g. electromagnetic wave-heat conversion material such as carbon) for converting an electromagnetic wave into heat, and expanding the site of the expansion layer where the image is formed on the medium by irradiation with an electromagnetic wave so as to rise outward.

A shaping system 1000 includes a control device 100, a display operation part 150, an expansion device (foaming device) 310, and a two-dimensional (2D) image formation device (printing device) 320, and is communicatively connected to a management device 500 via a network NW. The 2D image formation device 320 and the expansion device 310 constitute a stereoscopic image formation device 300. A stereoscopic image is also called "stereoscopic object" or "shaped object", and includes shapes in general such as simple shapes, geometric shapes, and characters.

The control device 100 is a general-purpose information processing device connected to the display operation part 150 and using an operating system (OS), and controls the expansion device 310, the 2D image formation device 320, and a bar code reader (identifier detection part) 315. The control device 100 includes a control part 10, a communication part 70, a volatile storage part 80, and a nonvolatile storage part 90. The communication part 70 is a network interface of WAN (Wide Area Network) or LAN (Local Area Network), and a serial interface or parallel interface of USB (Universal Serial Bus). The network interface is connected to the management device 500, and the serial interface or parallel interface is connected to the expansion device 310, the 2D image formation device 320, and the bar code reader 315.

The volatile storage part 80 is random access memory (RAM), and is used as working memory. The nonvolatile storage part 90 is a hard disk drive (HDD) or read only memory (ROM), and stores an OS 91, an application program 92, a printer driver 93, and the like. The display operation part 150 is a touch panel connected to the control device 100, and includes a display part that displays a 2D image and an input part that receives an input from an operator.

The expansion device 310 includes a halogen lamp (not illustrated) as a heat generator (heater), to heat one or both sides of a thermal expansion sheet 400 (FIG. 2) as a medium having, on one side, an expansion ink layer (thermal expansion layer 410 (FIG. 3)) that expands (foams) by heat. The expansion device 310 is configured to vary the conveyance speed V at which the thermal expansion sheet 400 is conveyed, the input power (heating power) of the halogen lamp, and the like. The input power (average input power) of the halogen lamp can be varied by varying the peak value or duty of a rectangular voltage. The expansion device 310 is thus configured to vary the heating amount (heating amount per unit area and per unit time) of the thermal expansion sheet 400. The expansion device 310 includes the bar code reader 315 that is configured to read a bar code 420 (FIG. 4) provided on the back side of the thermal expansion sheet 400.

Figure 2:
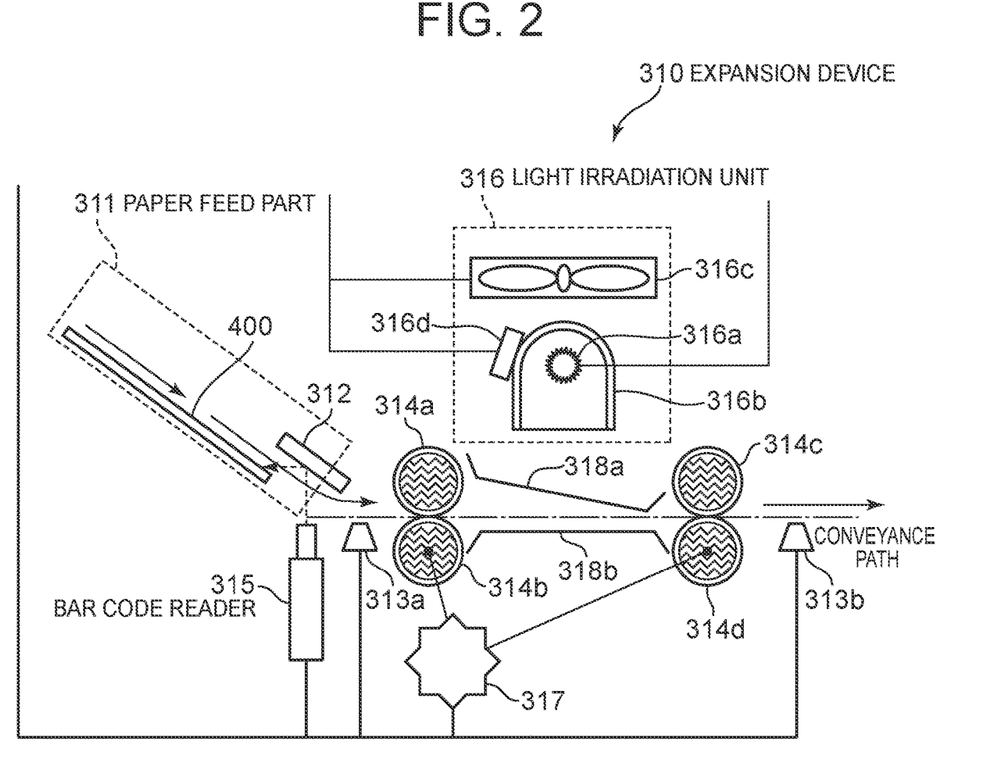
FIG. 2 is a block diagram of an expansion device.

FIG. 2 is a block diagram of the expansion device.

The expansion device 310 includes a paper feed part 311, a sensor 313, drive rollers 314b and 314d, driven rollers 314a and 314c, the bar code reader 315, a light irradiation unit 316, a motor 317, an upper guide 318a, and a lower guide 318b. The paper feed part 311 feeds the thermal expansion sheet 400 to the conveyance path, and includes a mirror 312. The sensor 313 includes an entrance sensor 313a and an exit sensor 313b. The light irradiation unit 316 includes a halogen lamp 316a, a reflector 316b, a cooling fan 316c, and a temperature sensor 316d.

The cooling fan 316c in the light irradiation unit 316 air-cools the reflector 316b. The temperature sensor 316d measures the temperature of the back of the reflector 316b. The reflector 316b is a parabolic reflector that reflects light (electromagnetic wave) in the visible light region or the near infrared region emitted from the halogen lamp 316a. The halogen lamp 316a and the reflector 316b correspond to a light irradiation process (heating process) of irradiating the thermal expansion sheet 400 with visible light or near infrared light to heat the thermal expansion sheet 400. When the thermal expansion sheet 400 printed with black ink including carbon black is irradiated with light, the light is converted into heat more efficiently in the portion printed with black ink than the portion not printed with black ink. Accordingly, the region printed with black ink in the thermal expansion layer 410 is mainly heated, and as a result the thermal expansion layer 410 expands in the region printed with black ink.

The bar code reader 315 corresponds to an identifier reading process of reading the bar code 420 (FIG. 4) as an identifier provided on the back side of the thermal expansion sheet 400. It is assumed here that the bar code 420 is longer in the direction at right angle to the conveyance direction of the thermal expansion sheet 400. Suppose the thermal expansion sheet 400 is placed in the placement position of the paper feed part 311 with its back side down. In such a case, the bar code reader 315 reads the front side of the thermal expansion sheet 400 by reflecting it with the mirror 312, and so cannot read the bar code 420 on the back side. Accordingly, a bar code reading control process 20 (FIG. 1) temporarily determines that the front side is up, and conveys the thermal expansion sheet 400 in the conveyance direction. As a result, the bar code reader 315 can read the bar code 420 on the back side of the thermal expansion sheet 400. At this time, the bar code reading control process 20 formally determines that the front side is up.

Suppose the thermal expansion sheet 400 is placed in the placement position of the paper feed part 311 with its back side up. In such a case, the bar code reader 315 can read the image of the bar code 420 on the back side of the thermal expansion sheet 400 as a mirror image. Accordingly, the bar code reading control process 20 temporarily determines that the back side is up, and conveys the thermal expansion sheet 400 in the conveyance direction. The bar code reader 315 directly reads the front side of the thermal expansion sheet 400 without involving the mirror 312, but cannot read the bar code 420 within a predetermined time. The bar code reading control process 20 then formally determines that the back side is up.

An image formation control process 40 (FIG. 1) causes the display operation part 150 to perform error display, in the case where the back side of the thermal expansion sheet 400 is up when the front side of the thermal expansion sheet 400 is supposed to be up, or the front side of the thermal expansion sheet 400 is up when the back side of the thermal expansion sheet 400 is supposed to be up.

The bar code 420 (FIG. 4) has a value determined depending on dispersion in the thickness t of the thermal expansion layer 410. In detail, the bar code 420 includes information of the thickness t of the thermal expansion layer 410 and its range, and these information to be specified. The identifier reading process may be an imaging element that reads not only the bar code 420 but also a mark.

The entrance sensor 313a detects that the leading end of the thermal expansion sheet 400 has reached immediately in front of the drive roller 314b and the driven roller 314a, and that the trailing end of the thermal expansion sheet 400 has reached immediately in front of the drive roller 314b and the driven roller 314a. In the case where the bar code 420 is located at an end in the conveyance direction, the bar code reading control process 20 (FIG. 1) can distinguish the front and back sides of the thermal expansion sheet 400 from each other based on the time difference between the timing of reaching of the leading end of the thermal expansion sheet 400 detected by the entrance sensor 313*a* and the timing of reading the bar code 420 by the bar code reader 315.

The driven rollers 314*a* and 314*c* and the drive rollers 314*b* and 314*d* convey the thermal expansion sheet 400, by sandwiching its edges from above and below. The drive rollers 314*b* and 314*d* are driven by the motor 317. The upper guide 318*a* and the lower guide 318*b* are formed like a grid, and guide the thermal expansion sheet 400 from above and below the conveyance path. The upper guide 318*a* is inclined so as not to cast a dark shadow over the thermal expansion sheet 400. Since the upper guide 318*a* and the thermal expansion sheet 400 are away from each other by a predetermined distance directly below the halogen lamp 316*a*, no dark shadow is cast over the thermal expansion sheet 400.

The exit sensor 313*b* detects that the leading end of the thermal expansion sheet 400 has been discharged from the drive roller 314*d* and the driven roller 314*c*, and that the trailing end of the thermal expansion sheet 400 has been discharged from the drive roller 314*d* and the driven roller 314*c*.

The 2D image formation device 320 is an inkjet printer that performs black printing (drawing) with black ink (black developer) including carbon to expand (foam) a specific site of the thermal expansion sheet 400 as a medium, and performs color printing with ink (developer) of CMY (cyan magenta yellow) on the whole surface of the thermal expansion sheet 400. Here, the thermal expansion sheet 400 is a sheet-like medium obtained by providing, on the front side of the base material 415 as base paper, the thermal expansion layer 410 that expands (foams) when heated. The 2D image formation device 320 accordingly needs image data (front side data) of the specific site for partially expanding the expansion layer on the front side of the medium, image data (back side data) for partially expanding the expansion layer from the back side of the medium, and color image data. The image data of each of the front side data and the back side data is expansion data for expanding the thermal expansion layer 410 by back printing. Black printing is thus performed to partially expand the thermal expansion sheet 400 (expansion paper) so that a stereoscopic shape is expressed by irregularities (roughness) of the front side of the thermal expansion sheet 400.

The 2D image formation device 320 performs printing using black ink, based on the front side data indicating the portion to foam and expand on the front side of the thermal expansion sheet 400. The 2D image formation device 320 equally performs printing using black ink, based on the back side data indicating the portion to foam and expand on the back side of the thermal expansion sheet 400. Black ink including carbon black is an example of a material for converting an electromagnetic wave (light) into heat. The material for converting an electromagnetic wave into heat may be another material. A portion where the density of black ink is higher has a greater expansion height of the thermal expansion layer. Hence, the density (gradation) of black ink is determined so as to correspond to a target height.

The halogen lamp 316*a* (FIG. 2) emits intense near infrared light, and thus heats a portion printed with black (carbon) intensely while the heating amount is low in a portion color-printed with CMY. Accordingly, the medium having the thermal expansion layer 410 expands (foams) only in a specific site printed with black. In other words, the 2D image formation device 320 prints an electromagnetic wave-heat conversion layer (black layer) for converting near infrared light as an electromagnetic wave into heat. Ink as a developer for black printing includes carbon, whereas CMY ink does not include carbon. Hence, black color obtained by a mixture of CMY is low in heating value.

The management device 500 is connected to the control device 100 via the network NW, and stores the manufacturing lot number and thickness range of the thermal expansion sheet 400 in association with the bar code 420. Since the thermal expansion sheet 400 tends to differ in the thickness t of the thermal expansion layer 410 depending on temperature or humidity, the thickness range differs for each manufacturing lot. The management device 500 therefore manages information of the manufacturing lot number and the thickness range using the bar code 420.

The control part 10 is a central processing unit (CPU), and executes the application program 92 to realize the functions of the bar code reading control process 20, a heating condition setting process 30, the image formation control process 40, a display operation control process 50, and a communication control part 60.

Figure 4:
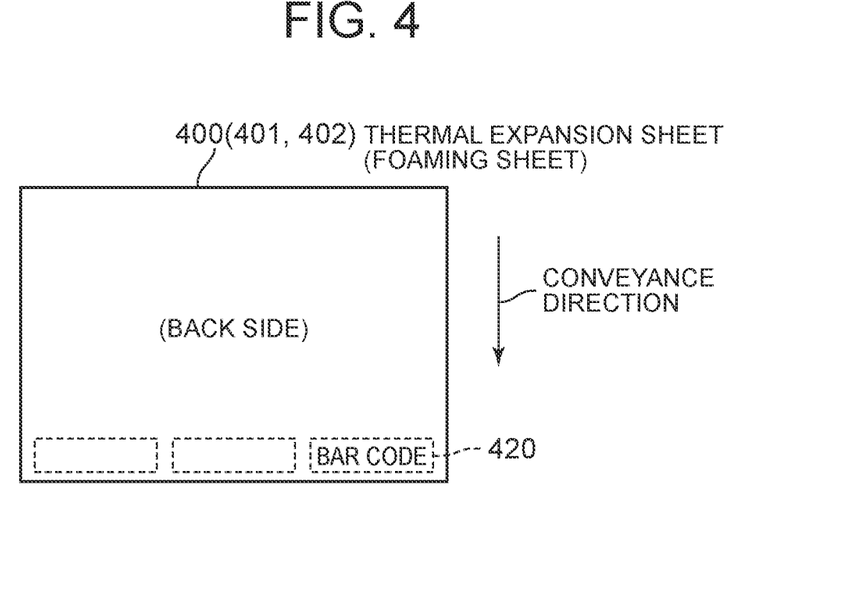
FIG. 4 is a diagram of the back side of the thermal expansion sheet.

The bar code reading control process 20 is a control process of causing the bar code reader 315 to read the bar code 420 (FIG. 4).

The heating condition setting process 30 sets the conveyance speed of the thermal expansion sheet 400 conveyed in the expansion device 310, the input power of the halogen lamp, the black developer image density, etc. to vary the heating amount (heating amount per unit area and per unit time) of the thermal expansion sheet 400. The heating condition setting process 30 sets the heating amount according to the bar code 420, so that the heating amount per unit area is set according to the thickness t of the thermal expansion layer 410.

The image formation control process 40 controls the stereoscopic image formation device 300. In detail, the image formation control process 40 controls the 2D image formation device 320 via the printer driver 93, and also controls the expansion device 310. In the case of controlling the 2D image formation device 320, the image formation control process 40 causes the display operation part 150 to display an image indicating "place the medium with the front side up on the placement table of the 2D image formation device 320", and causes the 2D image formation device 320 to form an image (print) on the medium using the front side data. The image formation control process 40 then causes the display operation part 150 to display an image indicating "place the medium with the back side up on the placement table of the 2D image formation device 320", and causes the 2D image formation device 320 to form an image on the medium using the back side data. Next, the image formation control process 40 starts the process in a flowchart in FIG. 8, and causes the expansion device 310 to heat the medium.

The display operation control process 50 has a function of causing the display operation part 150 to display an input screen or a screen for editing an image formed by the 2D image formation device, and an input function of receiving an input using the input screen.

The communication control part 60 corresponds to a control process of controlling the communication part 70.

Through the communication part 70, the communication control part 60 also controls the 2D image formation device 320 via USB (Universal Serial Bus), controls the expansion device 310 via a parallel I/F or a serial I/F, and transmits a digital image signal to the display operation part 150. When the communication control part 60 controls the 2D image formation device 320, the printer driver 93 is used. The communication control part 60 also has a function of communicating with the management device 500 via the network NW.

Figure 3:
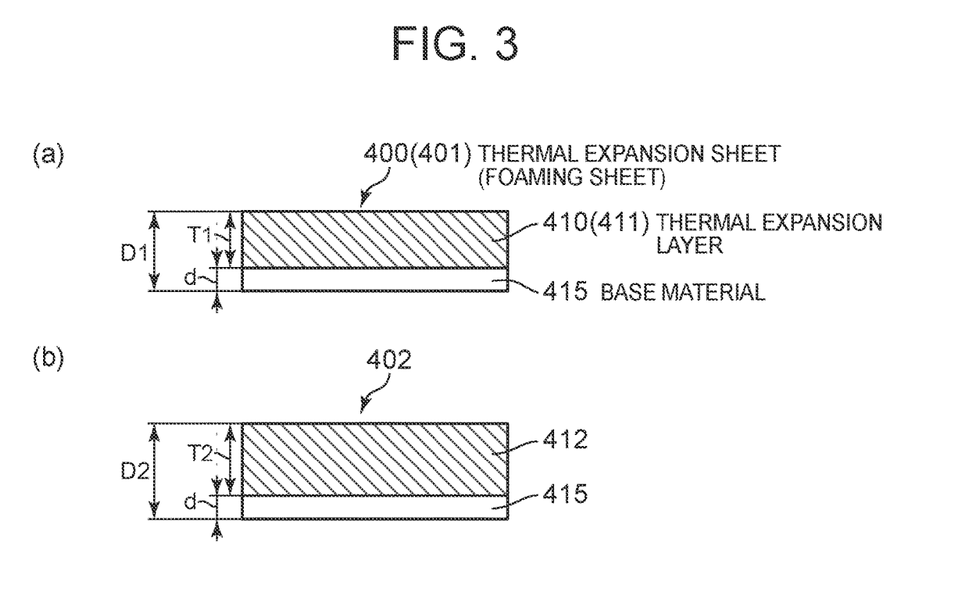
FIGS. 3A and 3B are each a sectional diagram of a thermal expansion sheet.

FIG. 3 is a sectional diagram of the thermal expansion sheet.

The thermal expansion sheet 400 is an expansion sheet obtained by coating the base material 415 as base paper with expansion ink as the thermal expansion layer 410. The thermal expansion layer 410 includes a binder and a thermal expansion agent dispersed in the binder. The binder is thermoplastic resin such as a vinyl acetate polymer or an acrylic polymer. The thermal expansion agent is, for example, thermally expandable microcapsules (micropowder) that are about 5 μm to 50 μm in particle diameter and have a substance which vaporizes at low boiling point, such as propane or butane, contained in the outer shell of the thermoplastic resin. For example, when the thermal expansion agent is heated to a temperature of about 80° C. to 120° C., the contained substance vaporizes, and the thermal expansion agent foams and expands by the pressure. Thus, the thermal expansion layer 410 expands according to the amount of absorbed heat.

A thermal expansion sheet 401 illustrated in FIG. 3A and a thermal expansion sheet 402 illustrated in FIG. 3B are manufactured in different manufacturing lots, and their thermal expansion layers 411 and 412 differ in thickness. In detail, the thermal expansion sheet 401 is obtained by coating a base material 415 having a thickness d with a thermal expansion layer 411 having a thickness T1, and has a thickness D1. The thermal expansion sheet 402 is obtained by coating the base material 415 having the thickness d with a thermal expansion layer 412 having a thickness T2, and has a thickness D2. Although the thickness d of the base material 415 is the same for the thermal expansion sheets 401 and 402 in this example, the thickness d of the base material 415 may be different.

FIGS. 11A to 11D are sectional diagrams illustrating 2D image formation and thermal expansion for the thermal expansion sheet.

Figure 11A:
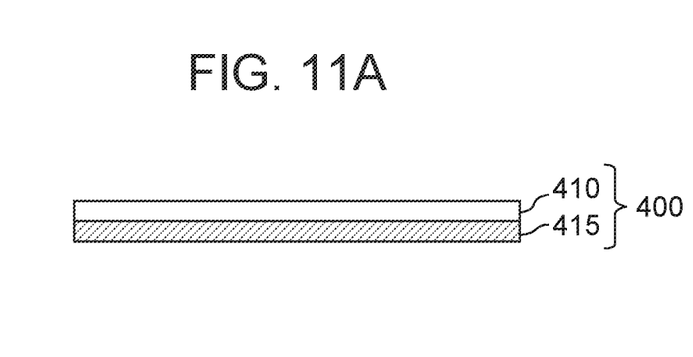
FIGS. 11A to 11D are sectional diagrams illustrating 2D image formation and thermal expansion for the thermal expansion sheet.
Figure 11B:
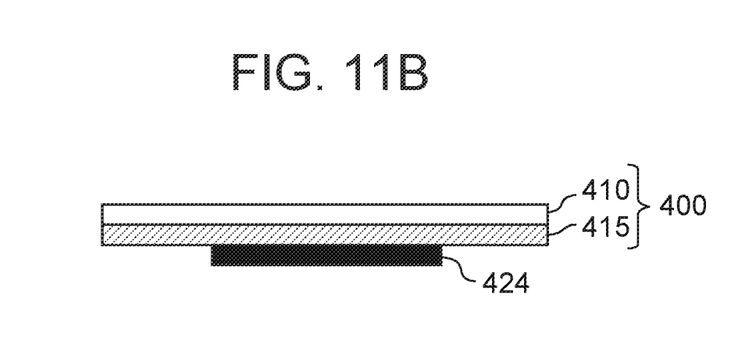
Figure 11C:
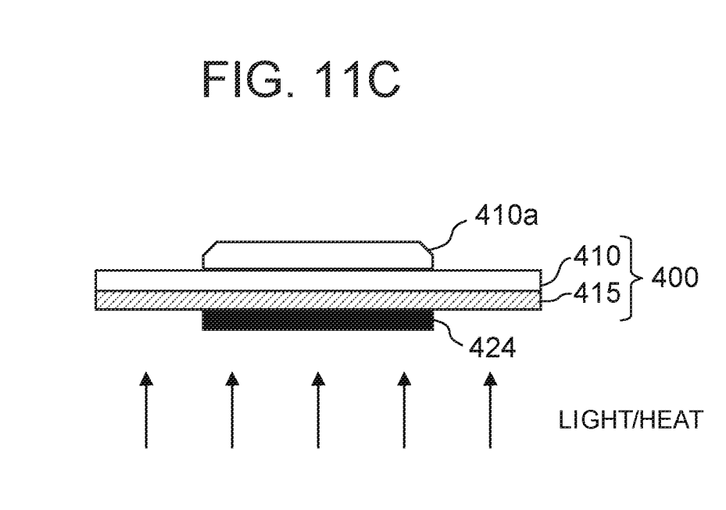

FIG. 11A is a sectional diagram of the thermal expansion sheet (foaming sheet) 400 and same as FIG. 3. FIG. 11B is a sectional diagram when the 2D image formation device 320 two-dimensionally forms an electromagnetic wave-heat conversion layer 424 (hereafter simply referred to as "conversion layer") using black ink on the back side of the thermal expansion sheet 400, i.e. on the base material 415. FIG. 11C is a sectional diagram of the state where the back side of the thermal expansion sheet 400 is irradiated with near infrared light from the halogen lamp 316a to form a thermal expansion layer 410a thermally expanding (foaming) by radiant heat. In FIG. 11C, the halogen lamp 316a generates intense near infrared light, thus intensely heating the conversion layer 424 including carbon. Hence, only the site of the thermal expansion layer 410 subjected to thermal conduction from the conversion layer 424 thermally expands, resulting in 2.5D printing.

Figure 11D:
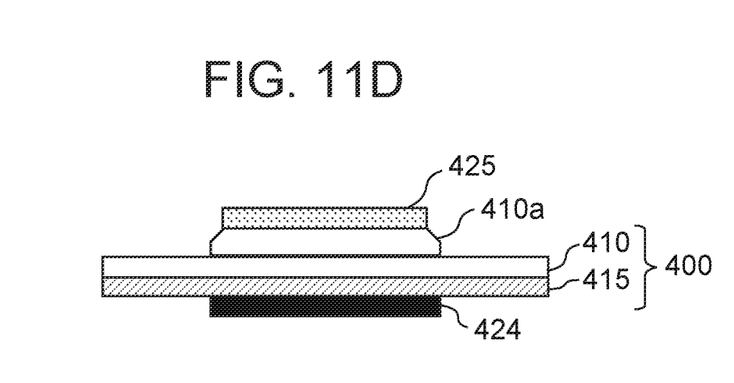

FIG. 11D is a sectional diagram of the state where the 2D image formation device 320 (FIG. 1) two-dimensionally forms a color image layer 425 using CMYK color ink (multicolor liquid developer) on the front side of the thermal expansion sheet 400, i.e. on the expanded thermal expansion layer 410a.

FIG. 4 is a diagram of the back side of the thermal expansion sheet.

The thermal expansion sheet 400 (401, 402) is, for example, A4 size. The bar code 420 is printed or attached on the back side of the thermal expansion sheet 400 at one corner, so as to be longer in the longitudinal direction. The bar code 420 indicates the manufacturing lot number of the thermal expansion sheet 401 or the thickness range of the thermal expansion layer 410. In the case where the bar code 420 indicates the thickness range of the thermal expansion layer 410, the control device 100 can recognize the range of the thickness T of the thermal expansion layer 410 by reading the bar code 420. In the case where the bar code 420 indicates the manufacturing lot number, the control device 100 can recognize the range of the thickness T of the thermal expansion layer 410 by transmitting the information of the bar code 420 to the management device 500 and receiving a response.

Figure 5:
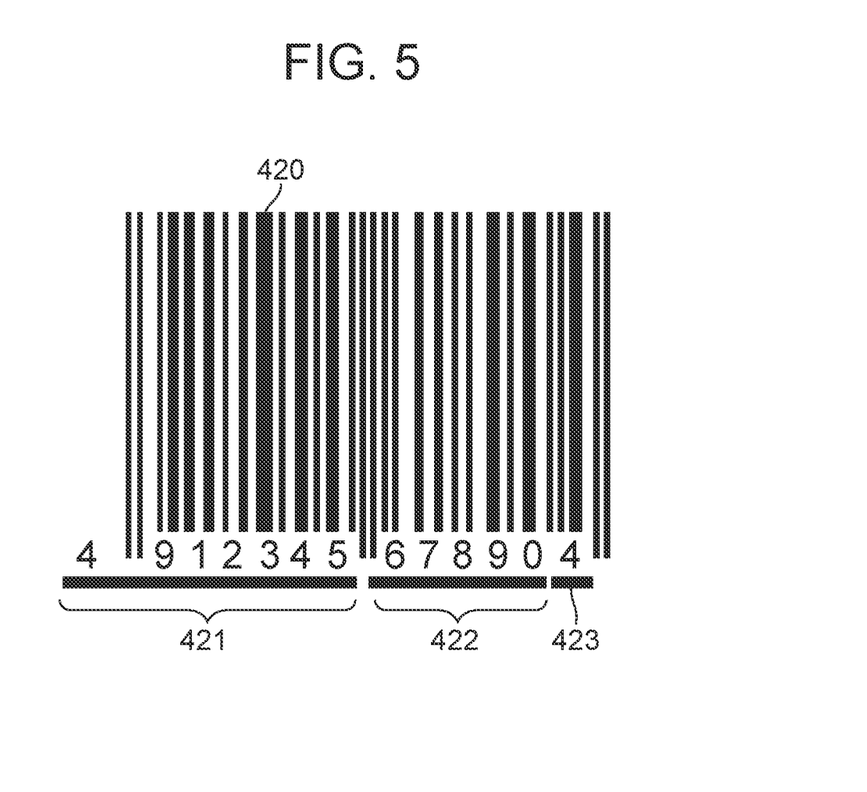
FIG. 5 is a diagram illustrating an example of a bar code.

FIG. 5 is a diagram illustrating an example of the bar code.

JAN code has two standard types of 13 digits and a shorter type of 8 digits usable only for small products. The JAN code illustrated in FIG. 5 has 7-digit GS1 company code, and is made up of three elements (regions): 7-digit GS1 company code (JAN company code) 421; 5-digit product item code 422; and check digit 423.

Figure 6:
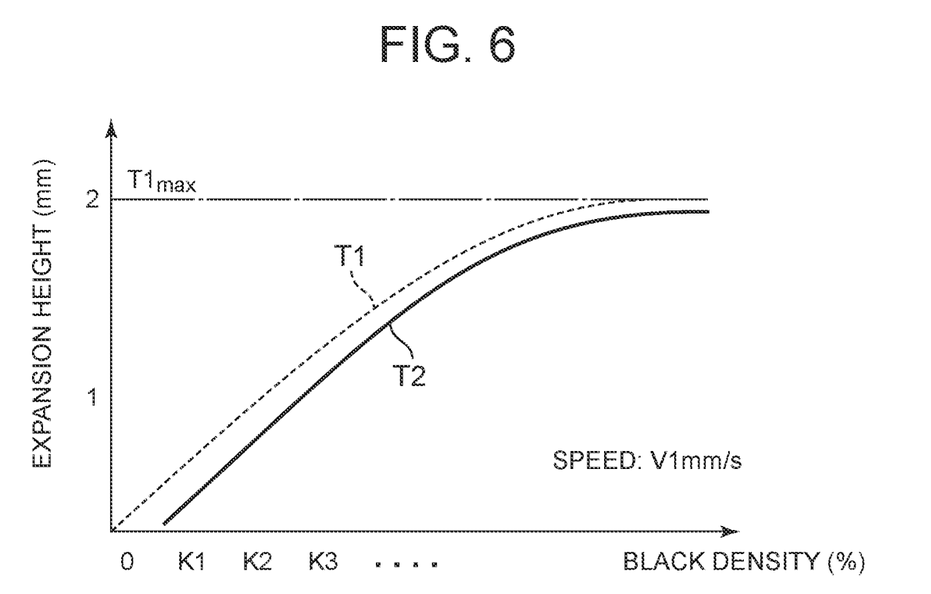
FIG. 6 is a diagram (1) illustrating the relationship between the developer image density and the expansion height.
Figure 7:
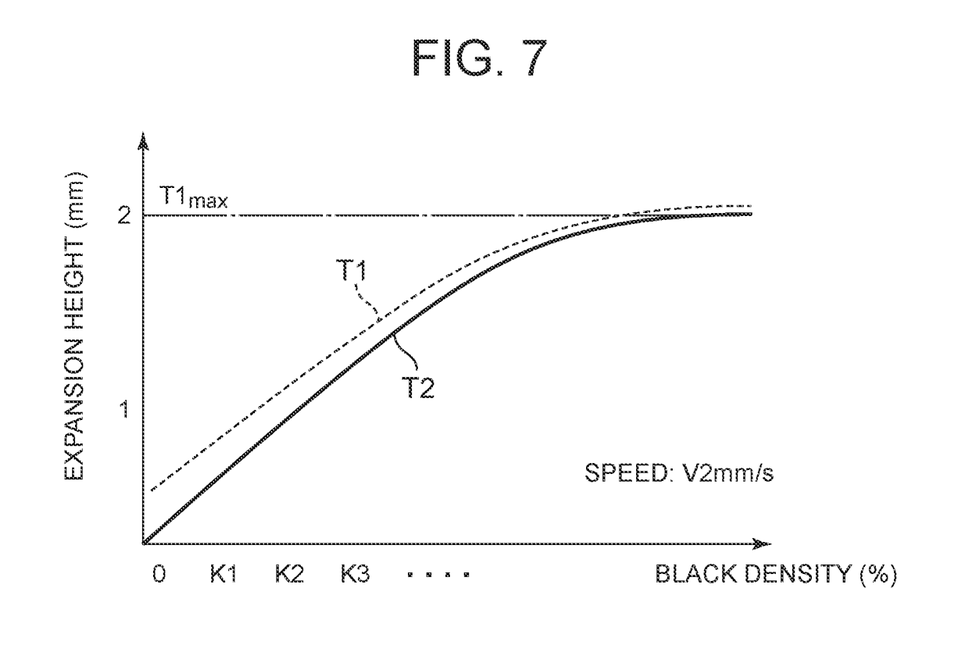
FIG. 7 is a diagram (2) illustrating the relationship between the developer image density and the expansion height.

FIGS. 6 and 7 are each a diagram illustrating the relationship between the developer image density and the expansion (foaming) height. FIG. 6 illustrates the relationship at the optimal speed V1 [mm/s] of conveying the thermal expansion sheet 401 having the thermal expansion layer 411 with the thickness T1. FIG. 7 illustrates the relationship at the optimal speed V2 [mm/s] of conveying the thermal expansion sheet 402 having the thermal expansion layer 412 with the thickness T2. The thickness T2 of the thermal expansion layer 412 is greater than the thickness T1 of the thermal expansion layer 411, and the optimal speed V2 of the thermal expansion sheet 402 is lower than the optimal speed V1 of the thermal expansion sheet 401. In FIGS. 6 and 7, the vertical axis represents the expansion height [mm], and the horizontal axis represents the density of the black developer including carbon [%]. FIGS. 6 and 7 thus illustrate the expansion heights of the thermal expansion sheets 401 and 402 when changing the density of the black developer, respectively at the optimal speeds V1 and V2. The thermal expansion sheet 402 having the thicker thermal expansion layer 412 is lower in expansion height than the thermal expansion sheet 401.

In FIG. 6, in the case where the thermal expansion sheet 401 having the thermal expansion layer 411 with the thickness T1 and the thermal expansion sheet 402 having the thermal expansion layer 412 with the thickness T2 are conveyed while being heated at the speed V1, the value of the thermal expansion sheet 401 passes the origin point, and the value of the thermal expansion sheet 402 does not pass the origin point. The thermal expansion sheet 401 with the thickness T1 has the optimal speed at the speed V1 with which the density and the expansion height are proportional in the vicinity of the origin point. The thermal expansion sheet 402 with the thickness T2 has the thicker thermal expansion layer 412, and so has substantially no expansion height in the vicinity of the origin point.

In FIG. 7, in the case where the thermal expansion sheet 401 having the thermal expansion layer 411 with the thickness T1 and the thermal expansion sheet 402 having the thermal expansion layer 412 with the thickness T2 are conveyed while being heated at the conveyance speed V2, the value of the thermal expansion sheet 401 does not pass the origin point, and the value of the thermal expansion sheet 402 passes the origin point. The thermal expansion sheet 402 with the thickness T2 has the optimal speed at the speed V2 with which the density and the expansion height are proportional in the vicinity of the origin point. The thermal expansion sheet 401 with the thickness T1 has the thinner thermal expansion layer 411, and so has expansion height even at the origin point.

Thus, the optimal speed V (V1, V2) of the thermal expansion sheet 400 (401, 402) changes depending on the thickness T (T1, T2) of the thermal expansion layer 410 (411, 412). Accordingly, by providing the thermal expansion sheet 400 with the bar code 420 and acquiring the information of the thickness T of the thermal expansion layer 410 from the bar code 420, the thermal expansion sheet 400 can be conveyed at the optimal speed V.

The thickness T (T1, T2) of the thermal expansion layer 410 (411, 412) changes depending on temperature or humidity during manufacture. Accordingly, by providing the thermal expansion sheet 400 with the bar code 420 corresponding to the manufacturing lot and inquiring the management device 500 (FIG. 1) about the range of the thickness T of the thermal expansion layer 410 corresponding to the bar code 420, the thermal expansion sheet 400 can be conveyed at the conveyance speed optimal for the thickness T by the control device 100 (FIG. 1).

Figure 8:
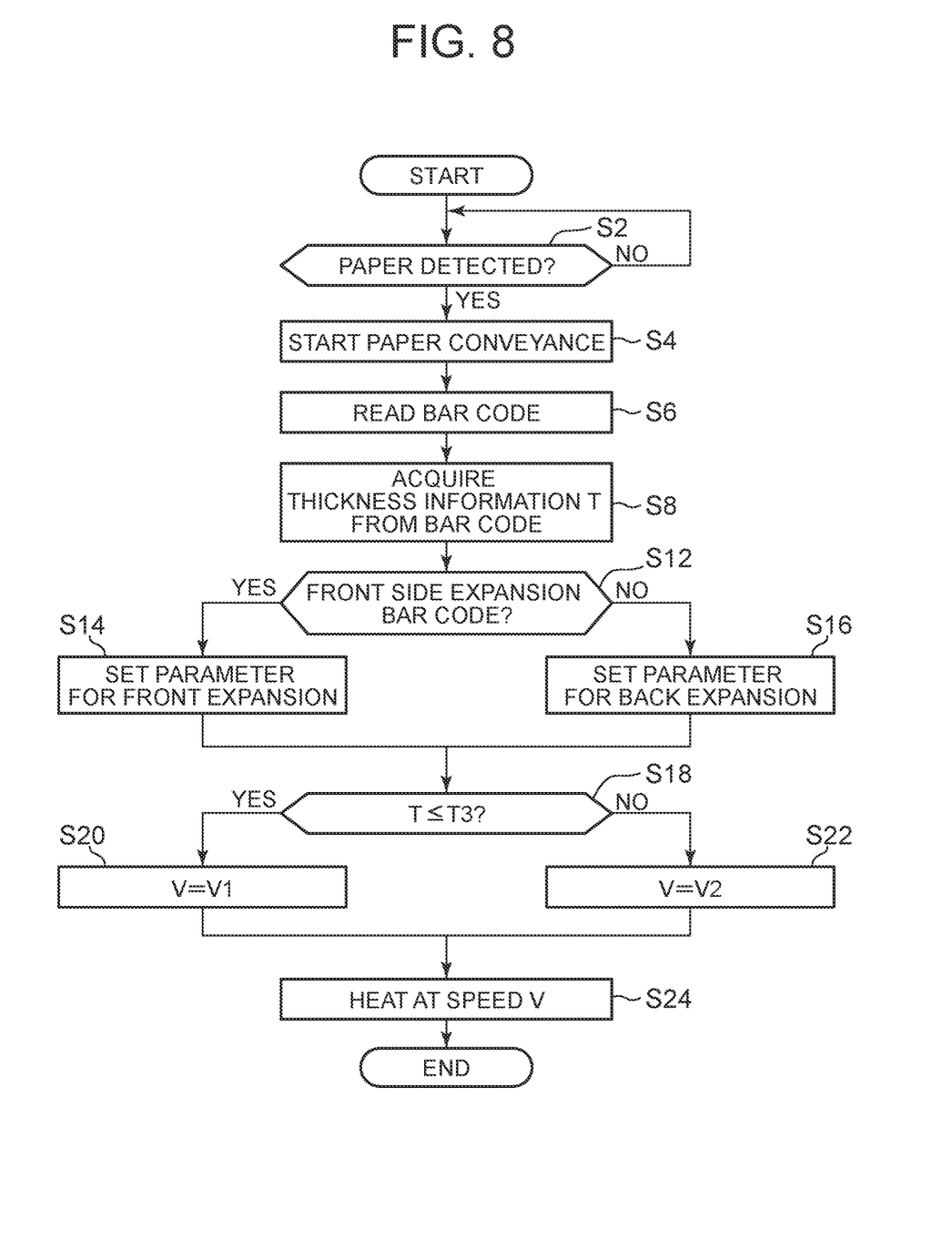
FIG. 8 is a flowchart illustrating the operation of the expansion device.

FIG. 8 is a flowchart illustrating the operation of the expansion device, and illustrates the operation performed by the expansion device 310 under control of the control device 100.

The image formation control process 40 determines whether or not paper is detected, using a paper detection sensor (not illustrated) installed in the conveyance path (S2). If paper (thermal expansion sheet 400) is not inserted in the expansion device 310 (S2: No), the process returns to S2, and the paper detection determination is repeated. If an operator inserts the thermal expansion sheet 400 in the expansion device 310 (S2: Yes), the image formation control process 40 starts paper conveyance (S4).

After S4, the bar code reading control process 20 reads, from the front or back side of the thermal expansion sheet 400, the bar code 420 printed or attached on the back side of the thermal expansion sheet 400, using the bar code reader 315 (S6). After S6, the bar code reading control process 20 acquires the information of the thickness T of the thermal expansion layer 410, from the bar code 420 read from the front or back side (S8). Here, a thickness information acquisition process 65 may transmit the information of the bar code 420 to the management device 500 (FIG. 1) via the communication part 70, and responsively receive the information of the thickness T of the thermal expansion layer 410 corresponding to the manufacturing lot.

After S8, the bar code reading control process 20 determines whether or not the bar code 420 read in S6 can be presumed as a front side expansion bar code (S12). If the bar code 420 is directly read without reflecting the image with the mirror 312, the bar code reading control process 20 presumes that the bar code 420 is the front side expansion bar code (S12: Yes), and the image formation control process 40 sets a parameter for front side expansion (S14). The parameter is, for example, the input power of the halogen lamp at the optimal conveyance speed V3 corresponding to a reference thickness T3 (T1<T3<T2) of the thermal expansion layer 410. If the bar code 420 is read from a reflection image (mirror image) formed by reflection with the mirror 312, the bar code reading control process 20 presumes that the bar code 420 is a back side expansion bar code (S12: No), and the image formation control process 40 sets a parameter for back side expansion (S16).

Although whether or not the bar code 420 is the front side expansion bar code is presumed based on whether or not it is reflected with the mirror 312 in this example, the bar code 420 may be provided on both sides of the thermal expansion sheet 400 to carry the information on the front and back sides. Here, a dye that is decolored by heat may be used for the bar code 420 provided on the front side of the thermal expansion sheet 400.

After S14 or S16, the heating condition setting process 30 compares the information of the thickness T acquired in S8, with the reference thickness T3 (S18). If the thickness T acquired from the bar code 420 is not more than the reference thickness T3 (S18: Yes), the heating condition setting process 30 sets the conveyance speed V to V1 (S20). If the thickness T acquired from the bar code 420 is more than the reference thickness T3 (S18: No), the heating condition setting process 30 sets the conveyance speed V to V2 (S22).

In S20 and S22, the heating condition setting process 30 may set a conveyance speed V1a or V2a suitable for front side expansion, or a conveyance speed V1b or V2b suitable for back side expansion. In detail, the heating condition is set to the conveyance speed V1a in the case of front side expansion and the thickness T<T3, set to the conveyance speed V2a in the case of front side expansion and the thickness T>T3, set to the conveyance speed V1b in the case of back side expansion and the thickness T<T3, and set to the conveyance speed V2b in the case of back side expansion and the thickness T>T3.

After S20 or S22, the image formation control process 40 heats the thermal expansion sheet 400 with the halogen lamp, while conveying it at the set conveyance speed V (=V1, V2) (S24). The image formation control process 40 then ends the heating process. As a result of this heating process, the black printing portion of the thermal expansion layer 410 (FIG. 3) in the thermal expansion sheet 400 expands (foams) to form a stereoscopic image.

As described above, in the shaping system 1000 according to the present embodiment, the bar code reader 315 in the expansion device 310 reads the bar code 420 on the back side of the thermal expansion sheet 400, the control device 100 specifies the thickness T of the thermal expansion layer 410 from the bar code 420, and the expansion device 310 conveys the thermal expansion sheet 400 while heating it at the optimal conveyance speed V1 or V2 corresponding to the thickness T.

In the shaping system 1000, if the bar code 420 indicates the manufacturing lot, the control device 100 transmits the information of the read bar code 420 to the management device 500 (FIG. 1), and receives the information of the thickness T of the thermal expansion layer 410. The expansion device 310 then conveys the thermal expansion sheet 400 while heating it at the optimal conveyance speed V1, V2 corresponding to the thickness T.

Second Embodiment

Although the conveyance speed of the expansion device 310 is variable according to the thickness T of the thermal expansion layer 410 in the first embodiment, the density of the black developer image formed by the 2D image formation device 320 may be varied.

Figure 9:
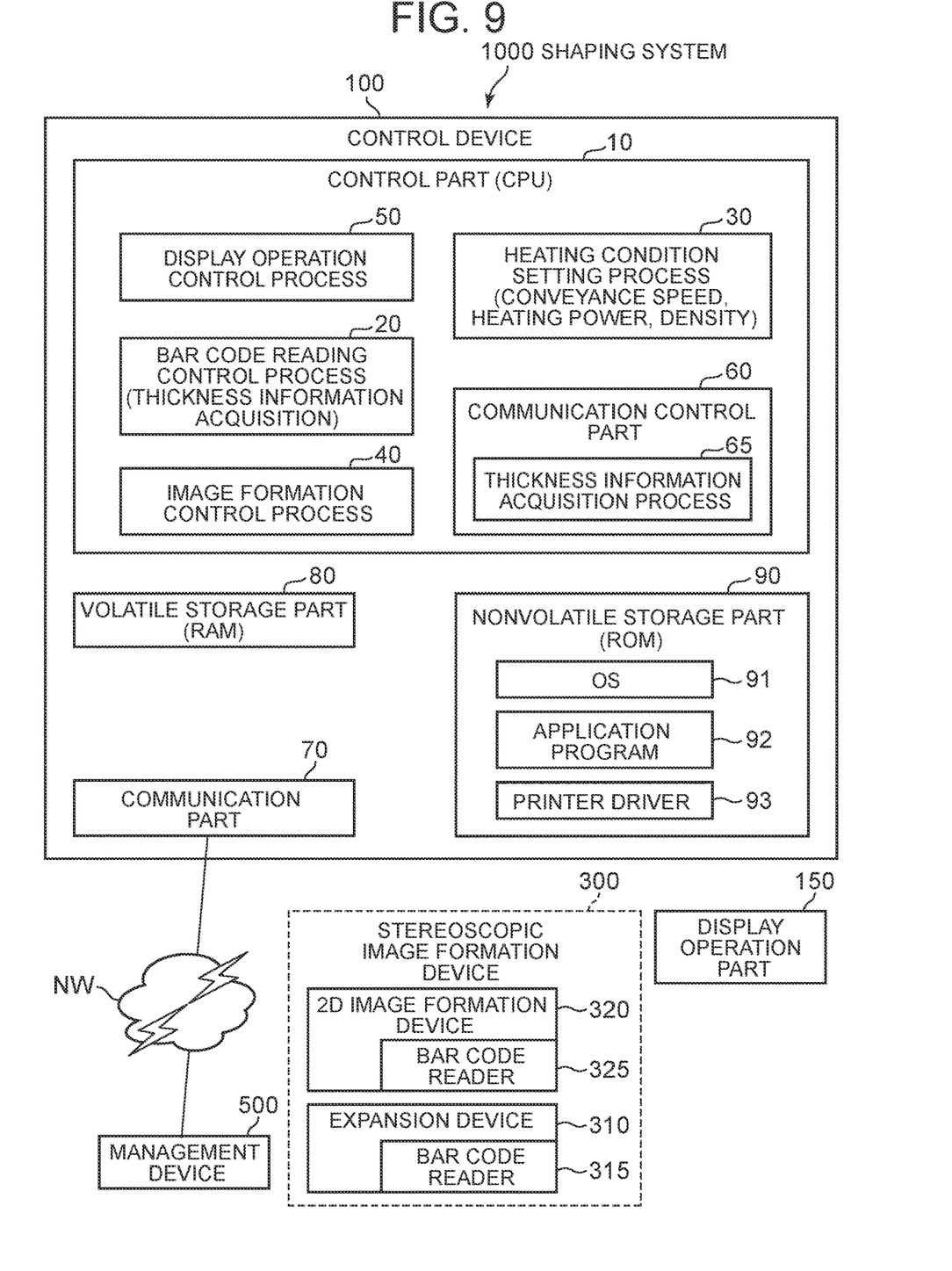
FIG. 9 is a block diagram of a shaping system according to a second embodiment of the present invention.

FIG. 9 is a block diagram of a shaping system according to a second embodiment of the present invention.

A shaping system 1001 according to the present embodiment differs from the shaping system 1000 according to the first embodiment in that the 2D image formation device 320 includes a bar code reader 325.

Figure 10:
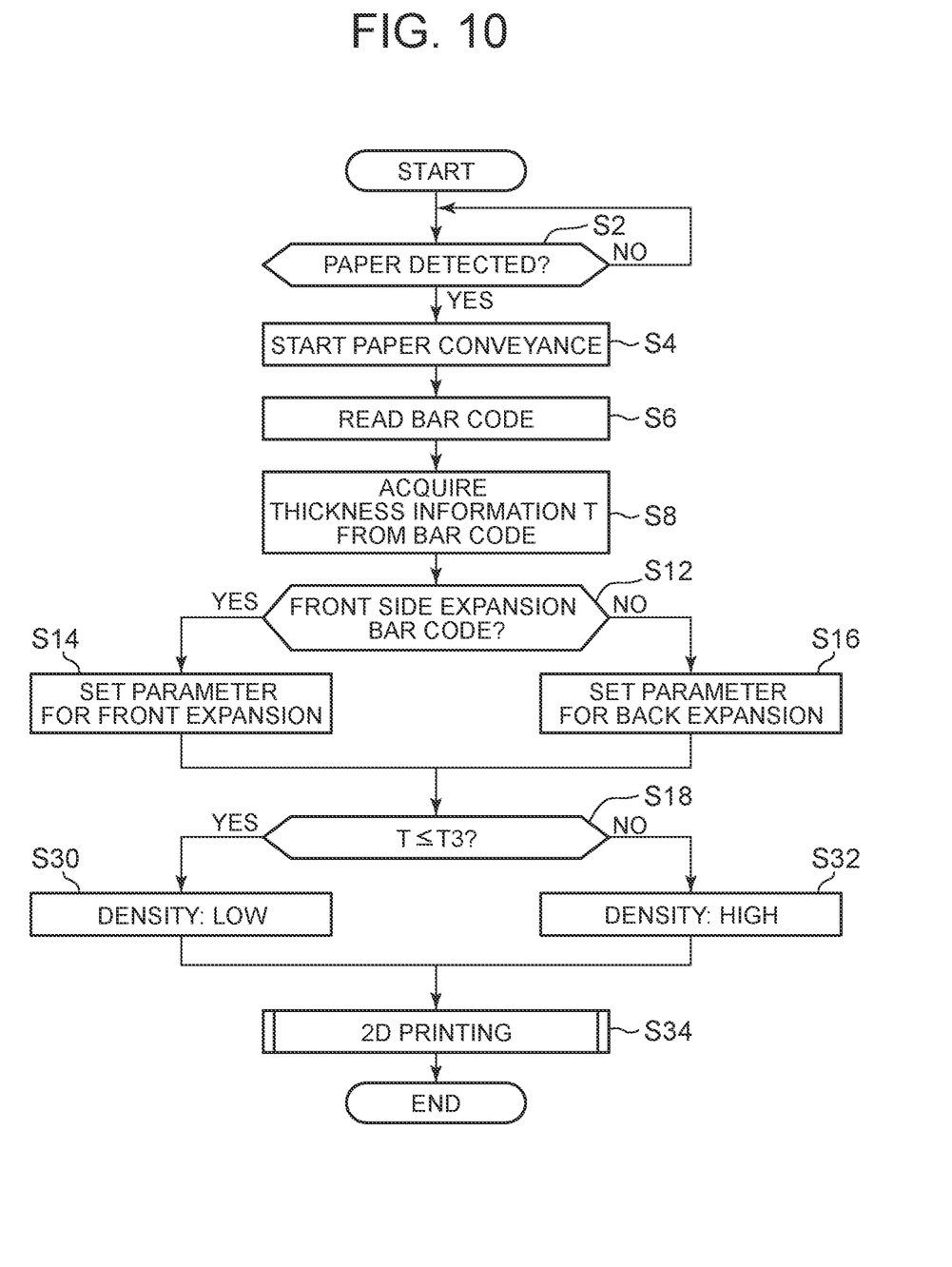
FIG. 10 is a flowchart illustrating the operation of the 2D image formation device.

FIG. 10 is a flowchart illustrating the operation of the 2D image formation device, and illustrates the operation performed by the 2D image formation device 320 under control of the control device 100.

The image formation control process 40 determines whether or not paper is detected, using a paper detection sensor (not illustrated) installed in the conveyance path (S2). If paper (thermal expansion sheet 400) is not inserted in the expansion device 310 (S2: No), the process returns to S2, and the paper detection determination is repeated. If an operator inserts the thermal expansion sheet 400 in the expansion device 310 (S2: Yes), the image formation control process 40 starts paper conveyance (S4).

After S4, the bar code reading control process 20 reads, from the front or back side of the thermal expansion sheet 400, the bar code 420 printed or attached on the back side of the thermal expansion sheet 400, using the bar code reader 315 (S6). After S6, the bar code reading control process 20 acquires the information of the thickness T of the thermal expansion layer 410, from the bar code 420 read from the front or back side (S8). The thickness information acquisition process 65 may transmit the information of the bar code 420 to the management device 500 (FIG. 1) via the communication part 70, and responsively receive the information of the thickness T of the thermal expansion layer 410 corresponding to the manufacturing lot.

After S8, the bar code reading control process 20 determines whether or not the bar code 420 read in S6 can be presumed as a front side expansion bar code (S12). If the bar code 420 is directly read without reflecting the image with the mirror 312, the bar code reading control process 20 presumes that the bar code 420 is the front side expansion bar code (S12: Yes), and the image formation control process 40 sets a parameter for front side expansion (S14). The parameter is, for example, the input power of the halogen lamp at the optimal conveyance speed V3 in the expansion device 310 corresponding to the reference thickness T3 (T1<T3<T2) of the thermal expansion layer 410, or a reference developer image density in the 2D image formation device 320. If the bar code 420 is read from a reflection image (mirror image) formed by reflection with the mirror 312, the bar code reading control process 20 presumes that the bar code 420 is a back side expansion bar code (S12: No), and the image formation control process 40 sets a parameter for back side expansion (S16).

Although whether or not the bar code 420 is the front side expansion bar code is presumed based on whether or not it is reflected with the mirror 312 in this example, the bar code 420 may be provided on both sides of the thermal expansion sheet 400 to carry the information on the front and back sides. Here, a dye that is decolored by heat may be used for the bar code 420 provided on the front side of the thermal expansion sheet 400.

After S14 or S16, the heating condition setting process 30 compares the information of the thickness T acquired in S8, with the reference thickness T3 (S18). If the thickness T acquired from the bar code 420 is not more than the reference thickness T3 (S18: Yes), the image formation control process 40 sets the black developer image density to be lower than the reference density (S30). If the thickness T acquired from the bar code 420 is more than the reference thickness T3 (S18: No), the image formation control process 40 sets the black developer image density to be higher than the reference density (S32).

In S30 and S32, the image formation control process 40 may set a black image density suitable for front side expansion, or a black image density suitable for back side expansion.

After S30 or S32, the image formation control process 40 controls the 2D image formation device 320 to form a black developer image on the thermal expansion sheet 400 with the set density (S34). The image formation control process 40 then ends the image formation process. Subsequently, the process in the flowchart in FIG. 8 described in the first embodiment is started, and the control device 100 controls the expansion device 310 to perform the thermal expansion process on the thermal expansion sheet 400 on which the 2D image has been formed. As a result, the black printing portion of the thermal expansion layer 410 (FIG. 3) in the thermal expansion sheet 400 expands (foams) to form a stereoscopic image (shaped object).

As described above, in the shaping system 1001 according to the present embodiment, the bar code reader 325 in the 2D image formation device 320 reads the bar code 420 on the back side of the thermal expansion sheet 400, the control device 100 specifies the thickness T of the thermal expansion layer 410 from the bar code 420, and the 2D image formation device 320 performs 2D image formation on the thermal expansion sheet 400 with the black developer of the optimal density corresponding to the thickness T.

Modifications

The present invention is not limited to the foregoing embodiments. Various modifications such as the following are possible.

(1) In the expansion device 310 in the foregoing embodiments, the mirror 312 (FIG. 2) is provided, and the bar code reader 315 detects the position of the bar code 420. The bar code reading control process 20 (FIG. 1) thus determines the side provided with the bar code 420. Alternatively, the expansion device 310 may have a structure in which the mirror 312 is omitted and the bar code reader 315 located on the opposite side of the halogen lamp to the conveyance plane of the thermal expansion sheet 400 detects only the direct image of the bar code 420.

(2) Although the conveyance speed V is changed according to the thickness of the thermal expansion sheet 400 (S20, S22) in the first embodiment, a parameter for expansion may be set according to information of whether or not the bar code 420 is present, using only the bar code reader 315 while omitting the mirror 312. In this case, the heating condition setting process 30 sets the heating condition (parameter such as black developer image density or conveyance speed according to which of the front and back sides is to be the heating surface) (S14, S16).

In the flowchart (FIG. 8) described above, if the bar code reading control process 20 presumes the front side expansion bar code (S12: Yes), the image formation control process 40 (FIG. 1) sets the parameter for front side expansion (S14). If the bar code reading control process 20 does not presume the front side expansion bar code (S12: No), the image formation control process 40 sets the parameter for back side expansion (S16). When the bar code 420 carries information on the front and back sides, the bar code 420 specifies the front or back side of the thermal expansion sheet 400. The heating condition setting process 30 then sets the heating condition (parameter such as black developer image density or conveyance speed) according to the side of the thermal expansion sheet 400 specified from the information of the bar code 420 (S14, S16). The identifier is not limited to the bar code 420, and may be an identification mark.

(3) In the flowchart (FIG. 8) in the first embodiment, the heating condition setting process 30 compares the information of the thickness T of the thermal expansion layer 410 with the reference thickness T3 (T1<T3<T2) (S18), and sets the conveyance speed V to the optimal speed V1 or V2 according to their magnitude relationship (S20, S22). Here, the heating condition setting process 30 may compare the acquired information of the thickness T with three reference thicknesses T3, T4, and T5 (T1<T3<T4<T5<T2). In this case, for example, the heating condition setting process 30 sets the optimal speed V1 when T1<T<T3, sets the optimal speed V2 when T3<T<T4, sets the optimal speed V3 when T4<T<T5, and sets the optimal speed V4 when T5<T<T2. In this case, at least 2 bits are needed when acquiring the information of the thickness T from the bar code 420.

(4) Although the expansion device 310 in the first embodiment is configured to vary the conveyance speed V or the input power (rectangular voltage or duty) of the halogen lamp 316a, the heating condition setting process 30 may adjust the black developer printing density. Moreover, the expansion device 310 may include a drive mechanism that changes the spacing between the halogen lamp 316a and the conveyance path or changes the spacing between the reflector 316b and the halogen lamp 316a. The heating temperature of the thermal expansion sheet 400 may be controlled by varying the rotation speed of the cooling fan 316c or installing a heat shield plate.

(5) Although the bar code 420 in the foregoing embodiments carries the information of the thickness T of the thermal expansion layer 420, the bar code 420 may carry the information of the conveyance speed V, the input voltage of the halogen lamp 316a, the ratio to a reference speed or a reference voltage, or the like, as the heating condition.

(6) Although the 2D image formation device 320 (FIG. 1) in the foregoing embodiments is an inkjet printer that jets ink (liquid developer) onto paper, an electrophotographic device that transfers toner as a developer to paper by charging may be used.

(7) Although the bar code 420 is provided on the back side of the thermal expansion sheet 400 in the foregoing embodiments, an IC tag as an identifier may be provided on the thermal expansion sheet 400 in the case of identifying only the thickness t of the thermal expansion layer 410 without distinguishing the front and back sides.

(8) Although the bar code reader 315 (FIG. 2) in the foregoing embodiments reads the bar code 420 (FIG. 4) printed or attached on one side of the thermal expansion sheet 400, bar codes 420a and 420b for identifying the front and back sides may be printed or attached on the respective sides (front side and back side) of the thermal expansion sheet 400. The bar codes 420a and 420b on both sides have a function of specifying the front and back sides of the thermal expansion sheet 400. The bar code 420 printed or attached on one side of the thermal expansion sheet 400 has a function of specifying one of the front and back sides of the thermal expansion sheet 400.

(9) Although the bar code 420 in the foregoing embodiments indicates the manufacturing lot number of the thermal expansion sheet 401 or the thickness range of the thermal expansion layer 410, the bar code 420 may include information such as the thickness d of the base material, the ratio of the thickness d of the base material and the thickness of the thermal expansion layer 411, and the paper quality (raw material). The heating condition is then determined according to these thickness information and other information.

What is claimed is:

1. A shaping system comprising:
    a printing device that prints an image on a thermal expansion sheet having a thermal expansion layer on one side;
    a heating device; and
    a controller configured to perform control of:
        an identifier detection process of detecting an identifier provided on the thermal expansion sheet;
        a heating condition setting process of setting a heating condition for heating the thermal expansion sheet, based on the identifier; and
        a heating process of heating the thermal expansion sheet based on the set heating condition,
    wherein the identifier includes information of a thickness of the thermal expansion layer, and
    wherein the controller sets the heating condition, according to the information of the thickness of the thermal expansion layer acquired from the identifier.

2. The shaping system according to claim 1, wherein the identifier specifies a front side or a back side of the thermal expansion sheet, and
    wherein the controller sets the heating condition, according to the side of the thermal expansion sheet specified by the identifier.

3. The shaping system according to claim 1, wherein the heating condition comprises a conveyance speed of the thermal expansion sheet, or a heating power when heating the thermal expansion sheet.

4. The shaping system according to claim 3, wherein the controller:
    sets the conveyance speed of the thermal expansion sheet to a predetermined speed or sets the heating power to a predetermined value, in a case where the thickness of the thermal expansion layer is more than a predetermined value; and
    sets the conveyance speed of the thermal expansion sheet to be higher than the predetermined speed or sets the heating power to be higher than the predetermined value, in a case where the thickness of the thermal expansion layer is not more than the predetermined value.

5. The shaping system according to claim 1, wherein the printing device includes an identifier detection part that detects the identifier.

6. The shaping system according to claim 5, wherein the printing device:
    prints an image using one of a developer including carbon and an ink including carbon, on the thermal expansion sheet; and
    sets a density of the image as the heating condition for heating the thermal expansion sheet, according to the identifier detected by the identifier detection part.

7. The shaping system according to claim 6, wherein the printing device sets the density of the image, according to the information of the thickness of the thermal expansion layer acquired from the identifier.

8. The shaping system according to claim 7, wherein the printing device:
    sets the density for printing the image to a predetermined density, in a case where the thickness of the thermal expansion layer is not more than a reference value; and sets the density for printing the image to be higher than the predetermined density, in a case where the thickness of the thermal expansion layer is more than the reference value.

9. The shaping system according to claim 8, wherein the identifier specifies a front side or a back side of the thermal expansion sheet, and
wherein the controller sets a conveyance speed of the thermal expansion sheet or a heating power when heating the thermal expansion sheet, according to the side of the thermal expansion sheet specified by the identifier.

10. The shaping system according to claim 1, wherein the heating device includes a lamp and a reflector that irradiate the thermal expansion sheet with near infrared light, and
wherein the controller sets a spacing between the lamp and the reflector, as the heating condition.

11. The shaping system according to claim 1, wherein the identifier comprises an identification code or an identification mark.

12. A shaping system comprising:
a printing device that prints an image on a thermal expansion sheet having a thermal expansion layer on one side;
a heating device; and
a controller configured to perform control of:
an identifier detection process of detecting an identifier provided on the thermal expansion sheet;
a heating condition setting process of setting a heating condition for heating the thermal expansion sheet, based on the identifier; and
a heating process of heating the thermal expansion sheet based on the set heating condition,
wherein the identifier includes information of a manufacturing lot of the thermal expansion sheet,
wherein the shaping system further comprises a communication part that transmits the information of the manufacturing lot to a management server, and receives thickness information of the thermal expansion layer corresponding to the thermal expansion sheet in response to transmission of the information of the manufacturing lot, and
wherein the controller sets the heating condition for heating the thermal expansion sheet, according to the received thickness information.

13. The shaping system according to claim 12, wherein the identifier specifies a front side or a back side of the thermal expansion sheet, and
wherein the controller sets the heating condition, according to the side of the thermal expansion sheet specified by the identifier.

14. The shaping system according to claim 12, wherein the heating condition comprises a conveyance speed of the thermal expansion sheet, or a heating power when heating the thermal expansion sheet.

15. The shaping system according to claim 12, wherein the printing device includes an identifier detection part that detects the identifier.

16. The shaping system according to claim 15, wherein the printing device:
prints an image using one of a developer including carbon and an ink including carbon, on the thermal expansion sheet; and
sets a density of the image as the heating condition for heating the thermal expansion sheet, according to the identifier detected by the identifier detection part.

17. The shaping system according to claim 16, wherein the printing device sets the density of the image, according to the received thickness information.

18. The shaping system according to claim 17, wherein the printing device:
sets the density for printing the image to a predetermined density, in a case where the thickness of the thermal expansion layer is not more than a reference value; and
sets the density for printing the image to be higher than the predetermined density, in a case where the thickness of the thermal expansion layer is more than the reference value.

19. The shaping system according to claim 18, wherein the identifier specifies a front side or a back side of the thermal expansion sheet, and
wherein the controller sets a conveyance speed of the thermal expansion sheet or a heating power when heating the thermal expansion sheet, according to the side of the thermal expansion sheet specified by the identifier.

20. The shaping system according to claim 12, wherein the heating device includes a lamp and a reflector that irradiate the thermal expansion sheet with near infrared light, and
wherein the controller sets a spacing between the lamp and the reflector, as the heating condition.

21. The shaping system according to claim 12, wherein the identifier comprises an identification code or an identification mark.

* * * * *

UNITED STATES PATENT AND TRADEMARK OFFICE
CERTIFICATE OF CORRECTION

PATENT NO. : 10,703,046 B2
APPLICATION NO. : 15/719105
DATED : July 7, 2020
INVENTOR(S) : Yuji Horiuchi and Yoshimune Motoyanagi It is certified that error appears in the above-identified patent and that said Letters Patent is hereby corrected as shown below:

On the Title Page

In item (72) after "Yuji HORIUCHI, Higashiyamoto (JP); Yoshimune MOTOYANAGI, Hamura (JP)" insert: --Hideki TAKAHASHI, Tokyo (JP); and Satoshi MITSUI, Ome (JP)--

Signed and Sealed this
Second Day of May, 2023

Katherine Kelly Vidal
*Director of the United States Patent and Trademark Office*